United States Patent [19]

Rennick

[11] 3,911,211

[45] Oct. 7, 1975

[54] STOP FRAME FOR OPTICAL PLAYBACK SYSTEM

[75] Inventor: John L. Rennick, Elmwood Park, Ill.

[73] Assignee: Zenith Radio Corporation, Chicago, Ill.

[22] Filed: Apr. 17, 1974

[21] Appl. No.: 461,573

[52] U.S. Cl. ... 178/6.6 R; 178/6.6 FS; 178/6.6 DD; 178/6.7 A; 179/100.3 D; 179/100.3 V; 360/10; 360/77

[51] Int. Cl.[2] ...................... H04N 5/76; G11B 17/00

[58] Field of Search ......... 178/6.6 R, 6.7 A, 6.6 FS, 178/6.6 DD; 360/10, 77; 179/100.4 R, 100.4 M, 100.41 L, 100.3 V, 100.3 B, 100.3 D

[56] References Cited

UNITED STATES PATENTS 3,854,015 12/1974 Jassen........................179/100.3 V

OTHER PUBLICATIONS

Janssen, et al., Control Mechanisms in the Philips 'VLP' Record Player, Philips Tech. Rev. Vol. 33, No. 7, pp. 190–193, 1973.

*Primary Examiner*—Raymond F. Cardillo, Jr.
*Attorney, Agent, or Firm*—Cornelius J. O'Connor

[57] ABSTRACT

An optical playback system for reading video discs with a laser beam has a radial servo including an arrangement for developing a correction signal representing the sense and extent of deviations of the reading beam from proper tracking relation to the storage track of the video disc. A driver responds to the correction signal and actuates a beam deflection mirror, displacing it in the proper sense and direction with respect to a reference position to maintain proper beam tracking. When stop frame operation is desired, a clamp is actuated once every revolution of the disc to supersede the correction signal and restore the beam deflecting mirror to its reference position as required to cause the beam to repeat its scan of a given convolution of the record track.

7 Claims, 4 Drawing Figures

STOP FRAME FOR OPTICAL PLAYBACK SYSTEM

BACKGROUND OF THE INVENTION

Optical playback systems have been proposed for transcribing a video record disc to derive the program information stored therein and supply it to a television receiver for reproduction. A particularly attractive feature of such a playback system is the lack of mechanical coupling of the sensing or reading mechanism with the storage track that normally takes the form of a multi-turn spiral. Where the readout is accomplished by scanning the record with a laser beam, it lends itself most effectively to variations in the speed of playback and also to what is referred to as a stop frame mode in which a single convolution of the record track is read repeatedly to the end that a single frame of the program is reproduced continuously for an observation period of any chosen duration. This can be especially useful for video discs having tutorial program information and is accomplished by optical playback devices quite easily and without any wear of the record track that is repeatedly read. This is in sharp contrast with other types of playback devices in which the record track is sensed by a tracking element that has a mechanical coupling with the record as is the case, for example, with the pressure type as well as the capacitive type playback systems.

Of course, the want of mechanical coupling of the readout head with the disc in the optical playback system imposes a need for a servo to retain the beam in optimum tracking relation with respect to the storage track of the record. Two types of servo systems are known, one for controlling radial displacement to keep the beam centered in the record track thus compensating for eccentricities and another for accomplishing tangential displacements to compensate for timing variations in the playback of a video record. The mechanism for implementing the present invention may be applied to either type servo but its most apparent useful application is to the radial servo to, in effect, backspace the beam periodically when stop frame conditions are desired.

Of course, arrangements for stop frame operation in optical playback systems have heretofore been proposed. In one, the radial servo system includes means for developing the radial-error correction signal and a two position switch having one setting through which the correction signal is coupled to a beam deflection mirror or other optical element, perhaps a movable lens, to maintain radial tracking. The second position of the switch disconnects the correction signal channel and couples in place thereof a pulse signal source which supplies periodic pulses to step the reading beam backward the width of one record groove in order to repeat the reading of a given frame of program information. While this approach may perform satisfactorily, it involves more complexity and expense than required with the stop frame arrangement embodying the present invention.

It is, therefore, an object of the invention to provide an improved and/or simplified stop frame arrangement for an optical playback system.

It is another and particular object of the invention to improve the radial servo portion of an optical playback system to achieve a stop frame mode of operation with simplified circuitry.

SUMMARY OF THE INVENTION

An optical playback system to which the invention has advantageous application comprises means for developing a reading beam such as a laser beam, and means for controlling that beam to scan the record track of an optical video record to derive a signal representing information stored in the record. The servo system for adjusting the scanning position of the beam in relation to the video record comprises means for developing a correction signal for adjusting the scanning position of the beam. Beam-deflection means, including an optical element biased to a reference in the path of the beam, responds to the correction signal and displaces the optical element from its reference position in a direction and amount determined by the correction signal. A feedback means applies the correction signal to the beam-deflection means. The components thus far enumerated maintain a desired scanning relation of the beam relative to the record track in known fashion. Clamping means are included in the feedback means having a first operating condition in which the feedback means energizes the beam-deflection means in accordance with the correction signal. In a second operating condition of the clamping means the feedback means is clamped to a reference signal condition to establish a fixed predetermined energization of the beam-deflection means. Finally, there are means for selectively actuating the clamping means between its first and second operating conditions periodically for a short interval once a revolution.

BRIEF DESCRIPTION OF THE DRAWINGS

The features of the invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements; and in which:

DESCRIPTION OF THE PREFERRED EMBODIMENT

Optical video discs are well known and are generally similar to an audio record disc, being constructed of a material such as polyvinyl chloride having the capability of storing program information. That information is stored in a multiturn track that usually takes the form of a spiral. Information is stored in the spiral track under the control of a carrier signal that may be frequency modulated by the information to be stored. For the most part, that information is comprised of luminance, chroma, audio and synchronizing components in all material respects the same as the components of a color television broadcast signal although the frequency assignments of these various components may be specifically different when modulating the carrier to be employed in producing the video disc than for a carrier to be transmitted to wave signal receivers. That difference, however, is of no consequence to the playback system under consideration and need not be further considered simply because the signal derived by reading the disc is easily transcoded to have the same composition as a broadcast television signal.

Storing information in the disc is accomplished by varying some parameter, such as transparency or diffraction of the disc, under the control of a modulated carrier signal to the end that the storage record is a spatial representation of the modulated carrier signal utilized in storing information in the disc. A popular form of storage track has a succession of pits or concavities which alternate with lands. These elements have a uniform width but their length and/or spacing is variable in order to achieve a spatial representation of the modulated carrier. The pit structure causes the diffraction of a reading beam which enters the pit and therefore facilitates and makes possible reading of the stored information whether the disc be transmissive to the reading beam or be reflective. Both modes of the operation are known. It is also known and desirable that the depth dimension of the pit be of the so-called quarter wave length variety which means that portions of the reading beam entering the pits have a phase displacement of $\pi/2$ degrees relative to portions of the beam that enter contiguous land sections of the disc. For convenience, the description will proceed on the assumption that the video record to be transcribed is of the transparent quarter-wave pit variety.

Figure 1:
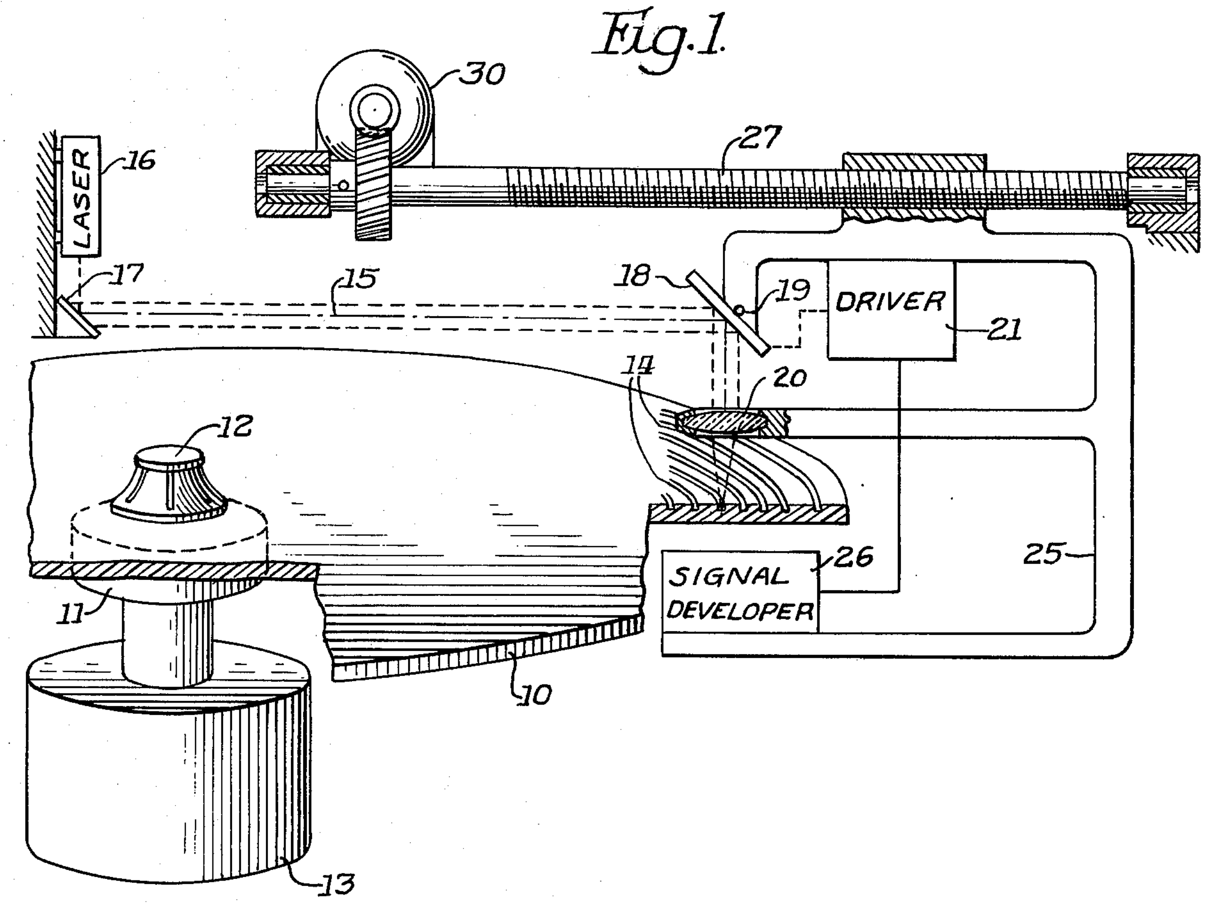
FIG. 1 is a schematic representation of an optical video playback system.

Such a disc 10 having a multi-turn track 14 of spiral configuration is represented in the playback apparatus of FIG. 1 supported upon a spindle 11 and secured thereon by a cap 12. The lower end of spindle 11 is coupled to a synchronous motor 13 which serves to rotate the disc 11 at a predetermined speed, usually 1800 RPM. This system flies disc 10 which, for the case under consideration, is a thin flexible record. Alternatively, the disc may be placed upon a turntable for rotation in which case it makes little difference whether the disc be sufficiently thin to be flexible or whether it is thick enough to be mechanically rigid. Usually, however, the reflective rather than the transmissive mode is employed when the disc is driven by a turntable.

In order to read storage track 14 of the disc, the apparatus is provided with an optical detection system featuring a reading beam 15 of monochromatic coherent light produced by a laser source 16. Frequently a helium neon laser is utilized. The specific location of the light source is quite immaterial since the beam is easily directed to an objective lens 20 by suitably positioned mirrors. As shown, the reading beam is first deflected by a stationary mirror 17 and then by a mirror 18 mounted for bi-directional displacement about a pivot 19 by means of a driver 21. Mirror 18 has a reference position in the path of the reading beam and is displaced therefrom in accordance with the polarity and amplitude of the energizing signal applied to driver 21. Of course, mirror 18 is biased to and seeks to return to its reference position. For convenience, the coupling from driver 21 to mirror 18 is represented by a broken line but the structure will be described hereinafter. A lens 20 focuses the reading beam into the plane of the storage track carried by disc 10.

It is necessary to move the reading beam radially of the record disc at an appropriate speed in order that all information carrying segments of the spiral track may be read seriatim. To that end pivot 19 of mirror 18 is supported from a frame 25 which also carries lens 20, driver 21 and a signal developer 26 to be described more particularly hereafter. This frame or carriage is supported from and has a threaded engagement with a rotatably mounted lead screw 27 shown as gear driven by a motor 30. The speed of that motor is selected to advance the focused spot of reading beam 15 radially inward at the appropriate rate to read the successive turns of record track 14. As well understood the speed of travel of the reading head is determined by the number of turns constituting track 14 and the speed of rotation of disc 10. It will be convenient in many installations to provide a crank (not shown) for manually rotating lead screw 27 to take further advantage of the stop frame mechanism presently to be described.

Figure 2:
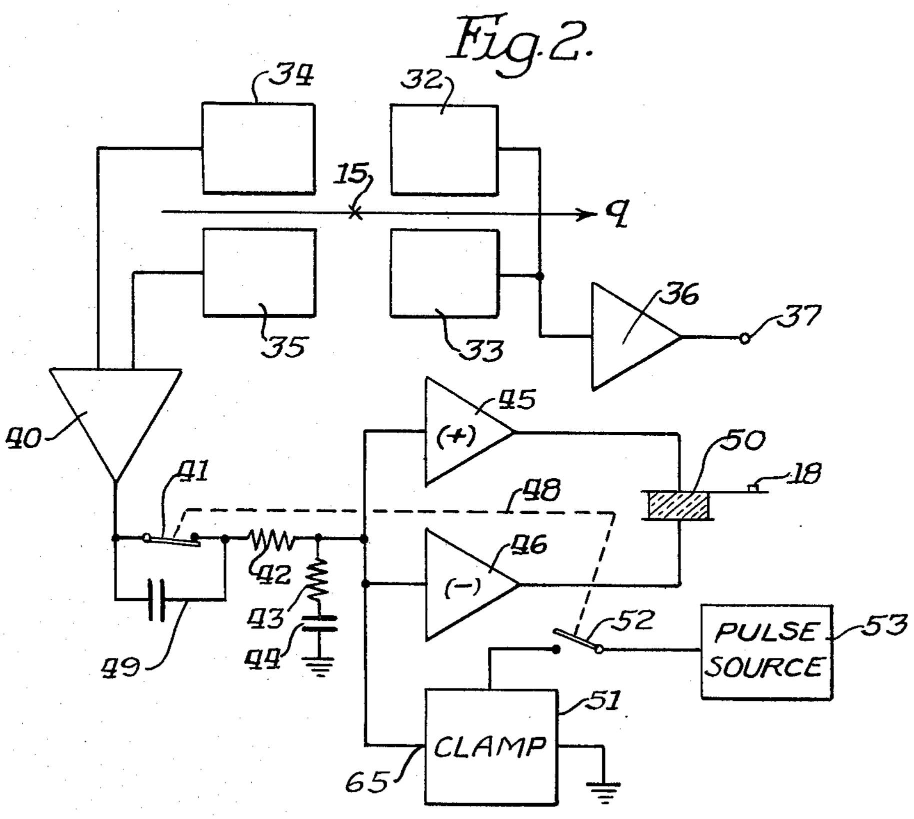
FIG. 2 represents in schematic form the circuitry of the radial servo arrangement of the system of FIG. 1, modified to include a stop frame feature embodying the subject invention.

The optical playback system of FIG. 1 is well known and, in operation, produces in signal developer 26 an electrical signal that represents the information stored in video disc 10. It is necessary for optimum operation to provide at least a radial servo for maintaining reading beam 15 properly registered with record track 14. The servo includes a feedback means through which driver 21 is energized by a correction signal to displace mirror 18 about its pivot 19 in the sense and amount necessary to maintain radial tracking. Arrangements of this type are known and an illustrative one is indicated in FIG. 2. In that figure, arrow 9 indicates the direction of travel of the record track with respect to the focused reading beam or spot 15. Signal developing unit 26 includes four photo-receptors or photocells 32, 33, 34 and 35 symmetrically positioned with respect to focused beam 15 on opposite sides of a reference plane also represented by arrow 9. It is a plane that is the normal to the major dimension or diameter of disc 10 and tangential to its record track at the point of the focused spot. One pair of photoreceptors 32, 33 are coupled together to deliver their outputs through an amplifier 36 to an output terminal 37 that may lead to a decoder or other suitable network by means of which the information signal derived in reading the disc is applied to a television receiver (not shown) for image reproduction. The remaining pair 34, 35 of photodetectors are coupled to a differential amplifier 40 the output of which represents a radial correction signal for energizing driver 21 to achieve controlled displacement of mirror 18 as required to maintain radial beam tracking. The differential amplifier is DC coupled by means of a normally closed switch 41 and a phase shifting network of resistors 42, 43 in conjunction with a capacitor 44 to additional amplifiers 45 and 46. These amplifiers are conventional transistorized components having the usual input and output electrodes (not shown) and have been designated (+) and (−) simply to denote that the correction signals delivered therefrom are of opposed polarity which is desirable in applying the correction signal to a piezoelectric bimorph or bender 50 which may carry a movable optical element, such as a lens or mirror 18, for displacing the reading spot a controlled amount in either direction radially a disc 10 as determined by the polarity and amplitude of the correction signal. Structurally, the bimorph is a sandwich or stack of two piezoelectric elements provided with electrodes on opposing faces and polarized to bend longitudinally from a quiescent or reference position in response to an applied voltage. The bimorph is cantilever mounted, being clamped at one end and supporting mirror 18 at its free end. In other words, the bimorph mirror serves the functions of components 18, 19 and 21 of FIG. 1. An attractive form of the bimorph arrangement is the subject of a co-pending application, now abandoned Ser. No. 439,684 filed Feb. 4, 1974 in the names of Robert Adler et al. and assigned to the assignee of the present invention.

On the other hand, it is appreciated that an electro magnetic form of driver can be employed in place of the aforementioned bimorph. For example, application Ser. No. 456,917, filed Mar. 29, 1974 in the name of Robert Adler, now abandoned, and application Ser. No. 456,918 filed Apr. 1, 1974 in the name of Karl H. Wossidlo, each describe electromagnetic types of drivers which control the displacement of an optical element and thus are capable of performing the function assigned to the bimorph.

In operation, a signal representing information stored in disc 10 is developed in photodiodes 32, 33 and delivered to an output terminal 37 for utilization while a radial-error correction signal developed under the control of photodetectors 34, 35 is translated with phase adjustment and amplification to the electrodes of bimorph 50 to control the position of mirror 18 in order to maintain radial tracking. As thus far described, the optical playback system, both as to its mechanical and electrical arrangements, is well known and as such constitutes no part of the present invention.

The subject invention concerns itself with adding the desirable feature of stop frame, accomplishing this mode of operation with a minimum of added circuitry. More specifically, clamping means 51 are provided in accordance with the invention, being included in the feedback path over which the radial correction signal is applied to bimorph 50. The clamp has a first or normal operating condition in which the path from differential amplifier 40 to bimorph 50 is DC coupled through switch 41 and the bimorph is energized in accordance with the radial correction signal. However, the clamp has a second or abnormal operating condition in which that path converts from DC to AC coupling and in which the feedback signal is periodically established at a reference signal condition to effect a fixed predetermined energization of bimorph 50 and, therefore, a reference position for mirror 18. This is accomplished by a normally open switch 52 which is actuated or closed to connect a pulse signal source 53 to clamp 51, constituting means for selectively actuating the clamp between its aforesaid first and second operating conditions. A unicontrol mechanism, indicated by broken construction line 48 operates switches 41 and 52 concurrently and in opposite senses. In the open position of switch 41 a capacitor 49 causes amplifier 40 to be AC coupled to amplifiers 45 and 46.

Figure 3:
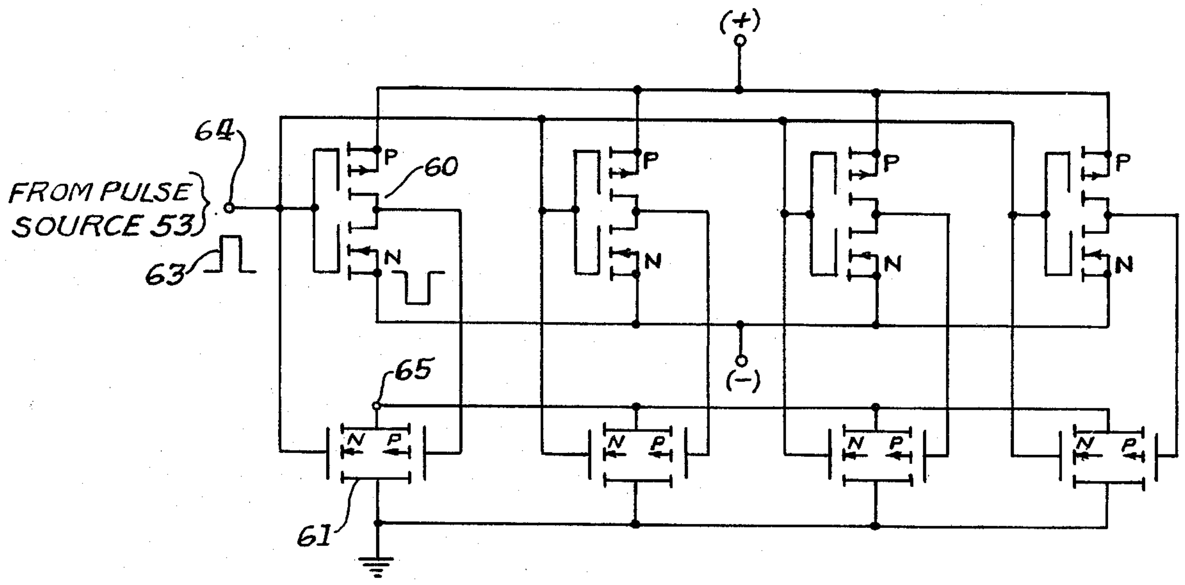
FIG. 3 shows the electrical detail of clamping circuitry included in the arrangement of FIG. 2.

A practical implementation of clamp 51 is shown diagrammatically in FIG. 3. It is a commercially available COS/MOS quad-bilateral switch marked by Radio Corporation of America under type designation CD 4016AD. It is an integrated circuit or chip having four identical sections only one of which need be described. Each such section comprises a pulse polarity inverter 60 and a bi-directional switch 61 having two field effect transistors (FET), one of the N and the other of the P gender. Positive and negative bias potentials are applied to each section as indicated. A pulse 63 delivered to input terminal 64 from source 53 is translated through the polarity inverting section 60 so that pulses of appropriate polarity are concurrently applied to both portions of switch 61. As a result both FET's of the switch are rendered conductive, completing a very low impedance path to ground from terminal 65 which is the terminal of clamp 51 that couples to the input electrodes of amplifiers 45 and 46.

During operating intervals in which switch 41 is closed and switch 52 is open, pulse source 53 is disconnected from clamp 51, and the radial servo operates in its conventional way to energize bimorph 50 with the radial correction signal developed in photodiodes 34, 35 and control the position of mirror 18 for proper radial tracking. When switch 52 is closed, switch 41 is open. This completes AC coupling in the feedback path by way of capacitor 49 and at the same time connects pulse source 53 to clamp 51. Throughout the duration of each pulse from source 53, switch sections 61 are rendered conductive and the input electrodes of amplifiers 45, 46 are essentially grounded or established at a fixed reference signal condition for the duration of each such pulse. The outputs of these amplifiers then assume i.e., are established at, fixed reference signal levels for the pulse duration and restore bimorph 50 to a fixed energization, restoring mirror 18 to a reference position necessary to repeat reading of a given turn of record track 14. Of course, this requires that motor 30 be de-energized through a unicontrol mechanism (not shown) during the intervals when switch 52 is closed to disable the motor-driven advance of the reading beam during stop-frame mode. It further requires proper timing of the clamping function to the end that restoring mirror 18 to a reference position leads the reading beam to the start of the track convolution that is instantaneously being read when the clamp is actuated. The timing is easily achieved by utilizing for pulse source 53 field retrace pulses derived in reading disc 10.

Since the signal stored in video disc 10 is to be compatible with the specifications of broadcast television transmission, each turn of record track 14 comprises not only the video information (luminance and chroma) but also the synchronizing components of two fields characteristic of double interlaced scanning. Hence, synchronizing pulses at the field rate are available through reading the disc and, if supplied to a 2 to 1 divider, the desired 30 cycle per second pulses, otherwise obtained from source 53 in FIG. 2, are developed to close switch sections 61 once each revolution of disc 10 and at the start of an image field. In other words, source 53 may be a 2:1 frequency divider fed with field sync pulses derived from disc 10. With switch 52 closed, the reference signal condition established in the servo feedback during alternate field retrace intervals steps reading beam 15 radially outward the distance between contiguous turns of track 14 so that the beam is properly positioned to read a given turn of the track a second time. After the beam has been repositioned and the stop-frame pulse period has expired, the servo loop resumes its response to the correction signal normally developed to preserve radial tracking during the ensuing re-reading of the particular track in question. So long as switch 52 remains closed, this operation is repeated and stop frame is thus effected. Since there is no mechanical tracking of the record groove, the stop frame mode may be carried out as long as desired without any destructive effect on the record. After the stop frame operation has accomplished its purpose, switch 52 may be opened and normal reading of disc 10 continued. This, of course, pre-supposes that motor 30 is reenergized as switch 52 is returned to its open position.

Figure 4:
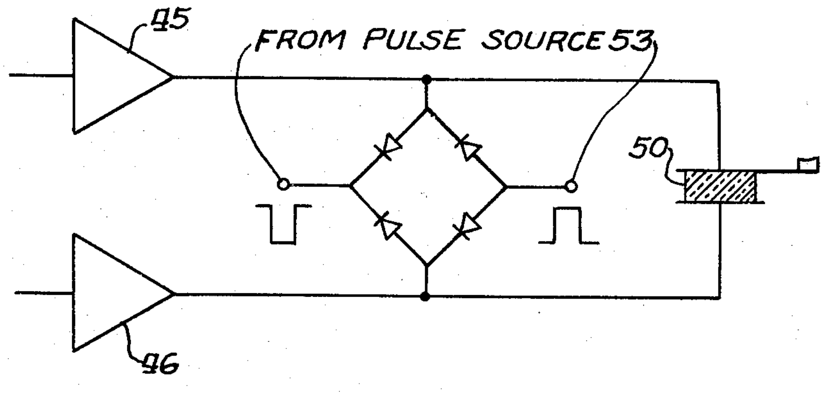
FIG. 4 shows a modification of the clamping arrangement.

The arrangement of FIG. 2 shows the clamp connected in a low voltage environment but that is not a limitation on the invention. If desired, a clamp of the type shown in FIG. 4 may be utilized in high voltage environments as, for example, between the leads extending to the electrodes of bimorph 50. In this case the clamp takes the form of a diode bridge which is normally non-conductive and represents an infinite impedance across the electrodes of the bimorph. Actuation of the clamp by 30 cycle per second pulses applied from source 53 to a pair of the bridge diagonals completes a low impedance path across the electrodes and installs the necessary reference signal condition or energization of the bimorph which steps the reading beam to replay or re-read a given track of the video record.

The obvious use of the described arrangement is for stop frame, that is, repetition of a single frame of the video disc for a controlled period whether that be long or short. Another attractive use, however, entails manual rotation of lead screw 27 with stop frame switch 52 closed. This facilitates a desired adjustment of frame speed, both fast and slow and in the forward or reverse direction to normal reading of the disc, at the operator's desire. It is only necessary to choose the proper direction of rotation of the lead screw and the proper speed of rotation to suit the operator's needs. Such flexibility facilitates frame selection in a manner analogous to page flipping.

In the stop-frame mode the only output from the radial detection system 34, 35, 40 is a repetitive 30 cycle signal representing eccentricities of video disc 10. This 30 cycle signal is clamped to a reference once each revolution of disc 10 during the pulse supplied by source 53 to clamp 51. The radial servo responds to this signal to maintain tracking in the stopframe mode. The reference signal condition established in the servo feedback during stop-frame pulses must be within the operating range of succeeding amplifiers, if there are any such as amplifiers 45 and 46, to avoid clipping the operating range of the servo.

While particular embodiments of the present invention have been shown and described, it is apparent that changes and modifications may be made therein departing from the invention in the broader aspects. The aim of the appended claims, therefore, is to cover all such changes and modifications as fall within the true spirit and scope of the invention.

What is claimed is:

1. In an optical playback system having means for developing a reading beam, means for controlling said beam to scan the record track of an optical video record to derive a signal representing information stored in said record, and a servo system for adjusting the scanning position of said beam in relation to said video record, the improvement in accordance with which said servo system comprises:

means for developing a correction signal for adjusting the scanning position of said beam;

beam-deflection means, including an optical element biased to a reference position in the path of said beam, responsive to said correction signal for displacing said element away from said reference position in a direction and amount determined by said correction signal;

feedback means for applying said correction signal to said beam-deflection means;

clamping means included in said feedback means having a first operating condition in which said feedback means energizes said beam-deflection means in accordance with said correction signal and having a second operating condition in which said feedback means is clamped to a reference signal condition periodically for a short interval once each revolution of said video record to establish a fixed predetermined energization of said beam-deflection means; and means for selectively actuating said clamping means between its aforesaid first and second operating conditions.

2. The improvement in accordance with claim 1 in which said beam-deflection means comprises a piezoelectric bimorph having a pair of electrodes across which said correction signal is applied, and in which said clamping means comprises a diode bridge coupled across said electrodes and presenting a high impedance during said first operating condition but presenting a low impedance during said second operating condition.

3. The improvement in accordance with claim 1 in which said feedback path is DC coupled to said correction signal developing means while said clamping means is in its first operating condition but is AC coupled to said correction signal developing means while said clamping means is in its second operating condition.

4. The improvement in accordance with claim 1 in which said feedback means includes an amplifier having an input electrode coupled to said correction signal developing means and an output electrode coupled to said beam-deflection means;

and in which said clamping means, in its aforesaid second operating condition, periodically couples said input electrode to a plane of fixed reference potential.

5. The improvement in accordance with claim 4 in which said input electrode is coupled to said correction signal developing means during both said first and second operating conditions of said clamping means;

and in which said clamping means in said second operating condition completes a path to said plane of fixed reference potential which path has an impedance that is low compared with that coupling said input electrode to said correction signal developing means.

6. The improvements in accordance with claim 1 in which said feedback means is AC coupled to said correction signal developing means for operating intervals in which said switch is in its aforesaid second operating condition.

7. The improvement in accordance with claim 6 in which said servo system adjusts the radial position of reading beam with respect to a spiral record track on said video record, and in which said predetermined energization of said beam-deflection means steps the position of said reading beam substantially the radial separation of successive terms of said spiral track and in a direction opposite to the scanning direction of said beam.

* * * * *